May 7, 1935. J. B. STRAUSS 2,000,425
APPARATUS FOR TAKING PHOTOGRAPHS
Filed June 18, 1931
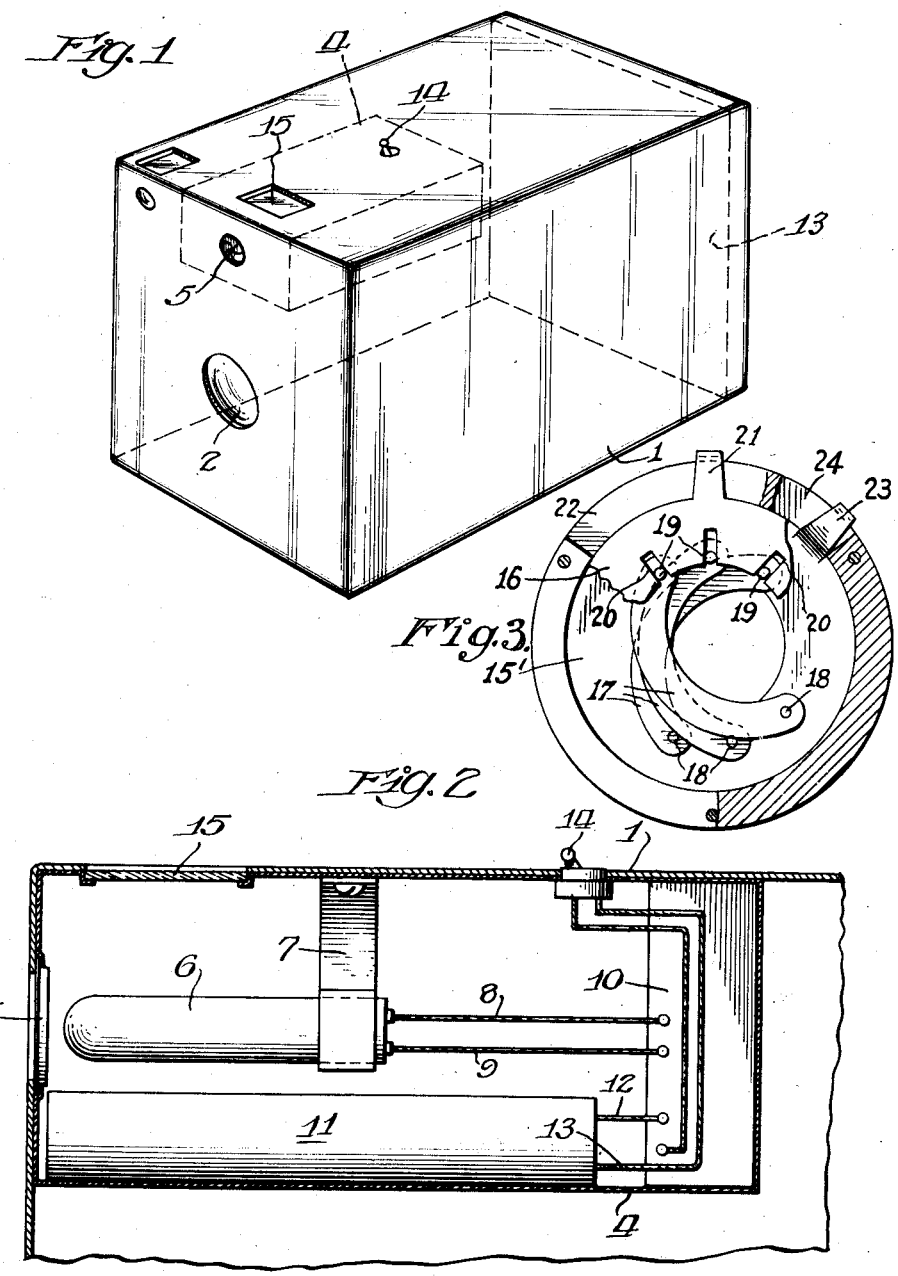

Patented May 7, 1935

2,000,425

UNITED STATES PATENT OFFICE 2,000,425

APPARATUS FOR TAKING PHOTOGRAPHS

Joseph B. Strauss, Chicago, Ill.

Application June 18, 1931, Serial No. 545,266

5 Claims. (Cl. 88—23)

This invention relates to an apparatus for taking photographs and has for its object to provide a new and improved device of this description. The invention has as a further object to provide a device for taking photographs arranged to automatically determine the intensity of light so that the operator may determine the exact exposure to give a photograph to secure the desired results. The invention has as a further object to arrange the device with a scale or chart so that the operator can easily determine the exposure under any given condition.

The methods at present used to determine the exact time exposure are uncertain. In some instances, for example, there is employed a meter having a sensitized sheet of paper, a portion of which is exposed to the light, and the length of time it takes to change to a given hue is noted and by references to a chart the exposure is determined. In other instances a tubular member, through which the operator looks at a number on a dial, is used and the brilliance of the numbers under certain conditions of light determine the exposure. Another method used consists in the use of charts based upon data gathered in different localities at different seasons of the year and the different times of the day. All of these methods are inaccurate and faulty, due to the inability to correctly determine the intensity of light at the actual time and place where the exposure is to be made, and it results in great loss and waste in over exposed or under exposed films and causes dissatisfaction on the part of the amateur with the results obtained.

This invention has as its purpose to overcome these difficulties by providing means which will accurately determine the exposure under any and all conditions and which is not dependent upon the judgment of the party using it, thereby securing a perfect photograph. The invention has other objects which are more particularly pointed out in the accompanying description.

Referring now to the drawing, Fig. 1 is a view of an apparatus showing one form of device embodying the invention;

Fig. 2 is an enlarged view showing the apparatus for determining the intensity of light.

Fig. 3 is a view in part section and with parts broken away showing an adjustable diaphragm.

Referring now to the drawing, I have shown in Fig. 1 a photographic apparatus or camera 1 having a suitable lens 2 and a sensitive plate or film 3 back of this lens. Any of the usual photographic apparatus may be used. I combine with this photographic apparatus an apparatus for automatically determining the intensity of light at any given time and place, so that the operator may determine the exact exposure to give a photograph at such time and place.

One form of this apparatus is illustrated in Fig. 2, wherein I have shown the box 4 containing the apparatus. This box is preferably located inside of the camera when in use. The box 4 is provided with a diaphragm 5 such as is ordinarily used with photographic lens. Back of this diaphragm is a photo-electric tube 6 arranged either to light or to become extinguished when the proper amount of light for the photograph to be taken at that time and place enters through the diaphragm. This tube is supported upon a suitable supporting device 7 which insures its being held in proper position with relation to the diaphragm 5. The tube 6 is connected by the conductors 8 and 9 with the photographic relay 10 of the kind used for this purpose, one form of which is manufactured by the General Electric Company under the title CR 7505 Photo-electric relay unit. The current for this relay may be secured from any suitable source, but the simplest method is by means of a battery 11 which is connected by conductors 12 and 13 with the relay. A suitable switch 14 is provided for cutting off the current when the device is not in use.

Some means is provided for permitting the user of the camera to easily see the tube 6, and this means is provided by the aperture 15 in the box 4, located so that the tube 6 can be easily seen therethrough. This aperture must be provided with means to prevent light passing therethrough from lighting or extinguishing the tube. This result may be accomplished by covering the observation aperture with a suitable red, orange or other colored glass or material, which, while it allows the observer to see the tube clearly, does not allow light of sufficient intensity to enter through the aperture to actuate the photo-electric cell or tube. Any suitable adjustable diaphragm may be used. In Fig. 3 I have illustrated one form of adjustable diaphragm. In this construction there are two discs 15' and 16 which have centrally located apertures. A series of segmentally shaped blades 17 are pivotally attached to the disc 15 by the pivots 18. These blades have laterally projecting pins 19 which work in slots 20 in the disc 16. The disc 16 has a projection 21 which projects through a slot 22 so as to be accessible and by means of which the disc may be moved to change the position of the blades 17 to adjust the size of the opening. The disc 15' is provided with a projection 23 which projects through a slot 24 and which is accessible to move said disc. It will be seen that by moving either or both of the discs 15' and 16 the relation of the blades 17 to the central opening of the disc will be changed and that said discs may be operated separately or together to close or enlarge the central opening.

In the use of the device the camera is adjusted so that the diaphragm and the lens point at the object to be photographed. To find the intensity of light falling upon the subject to be photographed, the operator opens or closes the diaphragm until the light striking the photo-electric cell or tube causes it to light, if it is adjusted for that purpose, or causes it to become extinguished if it is adjusted for that purpose. The diaphragm has a system of markings thereon denoting the intensity of light in any given adjustment, and the operator then notes the corresponding aperture number as indicated by this system of markings on the diaphragm, and he then consults the scale or chart, from which the photo-electric cell or tube has been calibrated, to find the time of exposure for this given marking on the diaphragm. For example if the diaphragm is adjusted so that when the photo-electric cell is operated, the marking on the diaphragm indicates that the light intensity is, for example, F. 4. The operator then consults the scale or chart from which the photo-electric cell or tube has been calibrated, and finds the proper exposure is, for example one second. The operator then may take his picture at that stop on the diaphragm, giving it the required one second time exposure, thereby securing a perfect photograph. It will thus be seen that by adjusting the diaphragm and consulting the chart, the operator can ascertain the proper exposure at any given time and place to secure a perfect photograph, and that this method of ascertaining the proper time exposure is wholly independent of the judgment of the operator, for it is automatically determined by the photo-electric cell. In other words, having established a scale of given exposures for various apertures in his diaphragm, the operator has but to adjust or calibrate his photo-electric cell experimentally to establish the perfect exposure for any given stop on the diaphragm, and he can thus ascertain with complete accuracy the proper time to give his exposure under all the conditions and use of the camera.

It will be further noted that the diaphragm and the photo-electric device are calibrated so that when the diaphragm is adjusted to permit the proper degree of light to impinge upon the photo-electric device to cause an indication, the time of exposure to take a proper photograph at that location and time can be ascertained.

I claim:

1. The combination with a photographic apparatus, of a lens through which light is admitted to the film, an adjustable diaphragm at a point at one side of said lens and separate therefrom adapted to regulate the amount of light entering said apparatus through said diaphragm, and a photo-electric device of a type that produces a luminous discharge when affected by light actuated by the light passing through said diaphragm, adapted to indicate when a given degree of light from said diaphragm impinges upon it.

2. The combination with a photographic apparatus, of a lens through which light is admitted to the film, an adjustable diaphragm at a point at one side of said lens and separate therefrom adapted to regulate the amount of light entering said apparatus through said diaphragm, and a photo-electric device of a type that produces a luminous discharge when affected by light actuated by the light passing through said diaphragm, adapted to indicate when a given degree of light from said diaphragm impinges upon it, a box containing said apparatus provided with an observation aperture for observing the indication of the photo-electric device, and means comprising a colored light transmitting member covering said observation aperture associated with said aperture for preventing light from the outside from acting on the photo-electric device to produce the indication.

3. The combination with a photographic apparatus, of a lens through which light is admitted to the film, an adjustable diaphragm separate from said lens adapted to regulate the amount of light entering said apparatus, and a photo-electric device of a type that produces a luminous discharge when affected by light actuated by the light passing through said diaphragm, said photo-electric device being adjusted to give an indication when the diaphragm is adjusted to permit a given degree of light to impinge upon said photo-electric device, said diaphragm and photo-electric device being calibrated so that the time exposure may be ascertained from the calibrations thereon when the adjustment of the diaphragm produces the indication on the photo-electric device.

4. A device of the kind described comprising a box, a diaphragm connected with said box so as to permit light from the exterior of the box to enter it, a photo-electric device of a type that produces a luminous discharge when affected by light in said box provided with a cell adjusted to give an indication when light of a predetermined intensity impinges upon it, the diaphragm and photo-electric device so located with relation to each other that the light passing through the diaphragm impinges on the photo-electric device, and means for adjusting said diaphragm to vary the intensity of the light passing therethrough.

5. A device of the kind described comprising a box, a diaphragm connected with said box so as to permit light from the exterior of the box to enter it, a photo-electric device of a type that produces a luminous discharge when affected by light in said box provided with a cell adjusted to give an indication when light of a predetermined intensity impinges upon it, the diaphragm and photo-electric device so located with relation to each other that the light passing through the diaphragm impinges on the photo-electric device, and means for adjusting said diaphragm to vary the intensity of the light passing therethrough, said box being provided with an observation aperture for observing said cell, and means comprising a colored light transmitting member covering said observation aperture associated with said observation aperture for preventing light entering therein from affecting the photo-electric cell so as to cause an indication to be produced.

JOSEPH B. STRAUSS.